United States Patent
Callewaert et al.

(10) Patent No.: US 7,432,667 B2
(45) Date of Patent: Oct. 7, 2008

(54) PROJECTOR LAMP CONTROL FOR INCREASED LAMP LIFE

(75) Inventors: Kurt Callewaert, Staden (BE); Patrick Candry, Harelbeke (BE); Paul Verledens, Izegem (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 11/438,291

(22) Filed: May 23, 2006

(65) Prior Publication Data

US 2006/0273744 A1 Dec. 7, 2006

(30) Foreign Application Priority Data

May 25, 2005 (EP) .................... 05011301

(51) Int. Cl.
*H05B 37/02* (2006.01)
(52) U.S. Cl. ...................... 315/307; 315/308
(58) Field of Classification Search ............. 315/146, 315/156, 158, 291, 307, 308; 359/237, 325
See application file for complete search history.

(56) References Cited

U.S. PATENT DOCUMENTS

| | | | | |
|---|---|---|---|---|
| 4,234,820 A | * | 11/1980 | Widmayer | 315/152 |
| 4,373,146 A | | 2/1983 | Bonazoli et al. | 315/209 R |
| 4,682,084 A | * | 7/1987 | Kuhnel et al. | 315/307 |
| 4,914,356 A | | 4/1990 | Cockram | 315/307 |
| 5,128,595 A | * | 7/1992 | Hara | 315/312 |
| 5,446,342 A | * | 8/1995 | Nilssen | 315/129 |
| 5,581,158 A | * | 12/1996 | Quazi | 315/149 |
| 5,608,294 A | | 3/1997 | Derra et al. | 315/224 |
| 5,789,723 A | * | 8/1998 | Hirst | 219/501 |
| 6,075,326 A | | 6/2000 | Nostwick | 315/307 |
| 6,215,252 B1 | | 4/2001 | Stanton | 315/224 |
| 6,326,740 B1 | | 12/2001 | Chang et al. | 315/291 |
| 6,480,806 B1 | * | 11/2002 | Bilz et al. | 702/154 |
| 6,543,900 B2 | * | 4/2003 | Noji et al. | 353/94 |

(Continued)

FOREIGN PATENT DOCUMENTS

JP 2000-28988 1/2000

(Continued)

OTHER PUBLICATIONS

Holger Moench et al, "Controlled Electrodes in UHP Lamps," *SID 2004 Digest*, pp. 946-949.

*Primary Examiner*—Douglas W. Owens
*Assistant Examiner*—Jimmy T Vu
(74) *Attorney, Agent, or Firm*—Bacon & Thomas, PLLC

(57) ABSTRACT

An electronic lamp control system for life time extension of a DC high intensity discharge lamp has a light sensor (130) for sensing an output of a lamp (31), a power supply (110) for the lamp (31), and a controller (20) for controlling the power supply (110). The controller (20) has a high pass filter (20*c*) for compensating for a leading edge of a detected change in lamp power output caused by each arc displacement. Lamp life is extended since damage to the lamp electrodes by the arc displacements is reduced. The system can have multiple lamps for the same illumination area, or multiple channels for illuminating different areas, coupled to provide uniform illumination. The controller (20) can compare a sensed level to a reference, to output a level control signal, then add a correction signal from the high pass filter to the level control signal.

11 Claims, 8 Drawing Sheets

U.S. PATENT DOCUMENTS

| | | | |
|---|---|---|---|
| 6,779,896 B2 | 8/2004 | Luerkens et al. | 353/84 |
| 7,116,053 B2 * | 10/2006 | Claus et al. | 315/108 |
| 2003/0020412 A1 | 1/2003 | Luerkens et al. | 315/291 |

FOREIGN PATENT DOCUMENTS

| | | |
|---|---|---|
| WO | WO 2004/010710 | 1/2004 |
| WO | WO 2004/036922 A1 | 4/2004 |
| WO | WO 2005/088382 A1 | 9/2005 |

* cited by examiner

PROJECTOR LAMP CONTROL FOR INCREASED LAMP LIFE

TECHNICAL FIELD OF THE INVENTION

The present invention relates to lamp control systems, to projectors having such lamp control systems, and to corresponding methods.

BACKGROUND OF THE INVENTION

It is known to provide projection displays having high intensity discharge lamps. There are a number of major types of High Intensity Discharge (HID) lamp technologies, including for example ultra high pressure mercury, short arc xenon and short arc metal halide types. HID lamps typically have a quartz glass lamp bulb and tungsten electrodes. The quartz glass bulb is the discharge vessel containing the electrode system and is filled with a gas or gas mixture. To start an HID lamp an ignition voltage (a series of high-frequency pulses typically in the 30 kV range) is required. One electrode has the function of cathode; the other has the function of anode. When an electric field is passed between the electrodes, electrons are emitted from the cathode by thermionic emission; the anode has to collect the electrons and has to dissipate more power than the cathode (negative workfunction). Both AC and DC operated HID lamps are known. Flicker is less of a problem with DC operated lamps.

U.S. Pat. No. 4,914,356 discloses that the standard practice to drive gas discharge lamps has been to supply the gas discharge lamp with alternating current (AC), and to use a series reactance to limit the current to the lamp. However, it is also possible to operate gas discharge lamps with direct current (DC).

DC operation of HID lamps has been used for example when only a DC supply is available and/or to reduce flicker. DC operation reduces life time significantly due to electrode erosion, see for example SID 2004 digest, page 946-949, Holger Moench et al. in "Controlled electrodes in UHP lamps", which states that for AC lamps, if electrodes and operating conditions are designed correctly, there is a balance between evaporation of electrode material and ion back-transport, which keeps the electrodes stable for over 10000 hours. This regenerative mechanism for lamp electrodes works well only for AC lamps, as in case of DC operation any ion current is directed towards the cathode only. Therefore, the hot anode quickly burns back. Thus, while AC lamps can be regenerated for thousands of hours, DC lamp electrodes are degrading quickly during lamp life.

The above difficulties with DC lamps have resulted in specialised DC designs being developed which differ significantly from AC designs. One design strategy to try and reduce the negative effect of evaporation of electrode material from one electrode to the other is to change polarity at each switch on. However, this requires symmetrical electrodes. It is preferred to use asymmetrical electrodes, i.e. to make the anode much larger in size and diameter (to keep its temperature under control) compared to the cathode, and therefore changing polarity on switch on is not an option. Although it is known to compensate for loss of electrode material, no electronic ballast technique is known to change the fundamental life time of DC operated lamps, especially ones with asymmetrical electrodes.

Furthermore, In addition, U.S. Pat. No. 4,373,146 states that electronic ballasts using DC lamp operation or phase control at low frequencies are not as desirable from a lamp life point of view.

Ways of operating AC HID lamps have been disclosed in U.S. Pat. No. 5,608,294 and U.S. Pat. No. 6,779,896. These ways of operating relate to reducing flicker phenomena. However, as the flicker phenomena of DC HID lamps differs fundamentally from those of AC lamps, such methods have never been considered for DC lamps.

The above design considerations have resulted in efficient AC operated HID lamps even for low power ratings such as 300 watt, with arc lengths 1.5 mm or less. Reducing arc length worsens the lifetime problem. Increasing the arc length inceases the operation voltage. Typically, DC operated lamps have been used for the higher power ratings, i.e. e.g. with arc lengths bigger than 2.5 mm and above 300 watt. There remains a need for improved DC devices.

SUMMARY OF THE INVENTION

It is an object of the present invention to provide improved apparatus relating to lamp control systems for DC operated lamps, especially lamp control systems for high intensity discharge (HID) lamps for DC operation, to projectors having such DC lamp control systems, to the use of such DC lamp control systems for extending life time and to corresponding methods.

The above objective is accomplished by a method and device according to the present invention.

In a first aspect, the present invention provides a lamp control system for life time extension of at least one DC discharge lamp, especially a high intensity discharge lamp. By DC discharge lamp is meant a lamp for DC operation whereby a DC voltage is applied continuously to the lamp to generate light. In particular, the present invention relates to short arc DC operated lamps, e.g. suitable for use in projectors. By short arc is meant a length between 1 and 4 mm, preferably a length between 1 and 2.5 mm, depending on the etendue of the system. A short arc length is necessary for use in projection systems, in order to obtain a sufficient coupling of the generated light into the optics of the projection system.

The lamp control system comprises at least one sensor for sensing an output of the DC lamp, at least one DC power supply for the at least one DC lamp, and a controller for controlling the at least one DC power supply according to an output of the at least one sensor. The controller is arranged to control the at least one DC power supply output by detecting and quasi instantaneously or even instantaneously compensating for a leading edge of a detected change in light collected by the illumination system, caused by each arc displacement. "Quasi instantaneously" means that the compensation is carried out faster than the temporal response of the human visual system.

A consequence of this compensation is that lamp life of DC operated lamps can be extended. Otherwise the erosion of the anode surface in terms of pits and craters on the surface, accumulates gradually over time, which in turn causes the arc displacements to become gradually more pronounced in frequency and amplitude, causing more damage, and so on, until the light output drops or the flicker becomes unacceptable, and the lamp needs to be replaced. Hence the combination of DC drive and edge compensation by a fast feedback loop can reduce the rate of accumulation of damage, and lead to extended lamp life. It is an unexpected result of the method according to the present invention that by quasi instantaneously or instantaneously compensating for a leading edge of a detected change in lamp power output caused by each arc displacement, the lifetime is extended significantly.

The present invention provides for the first time an electronic solution to lifetime extension of DC operated HID lamps. This is a significant improvement compared with the presently existing but poorly performing solutions, in which life time extension is generated by physical changes to lamp design such as electrode size, material choice for electrodes and applied coatings.

The controller may furthermore have a level control part to maintain a constant light output level.

The controller may have a control loop with a high pass filter for the edge compensation and a slower loop with low pass filter for the level control.

The system of the present invention may be adapted for controlling multiple DC lamps for a same illumination area, the controller being arranged to provide the edge compensation for each lamp separately, the level control part being common to more than one of the lamps.

The system according to the present invention may be adapted for use in a multi-channel system having multiple DC lamps for illuminating different areas, wherein the lamp control system is adapted so that each channel has a sensor and a level control loop, the channels being coupled such that the light output level of each channel corresponds to the output levels of others of the channels.

The controller may comprise a processing means under the form of an analog circuit, comprising an active electronic element such as a comparative amplifier, or it may comprise a processing means under the form of a digital circuit, comprising a processing element, such as a microprocessor or a digital logic device such as a programmable gate array (e.g. an FPGA), for comparing a sensed level to a reference, and outputting a level control signal to the at least one DC power supply.

The sensor may be a light sensor.

In a second aspect, the present invention provides a projector system with improved life time, the projector system having a lamp control system according to embodiments of the present invention. Embodiments of the present invention can be applied to front and to rear projectors.

In a third aspect, the present invention provides a method of extending life time of a DC discharge lamp, especially a DC high intensity discharge lamp, the method comprising detecting and quasi instantaneously, preferably instantaneously, compensating for a leading edge of a lamp power output change caused by an arc displacement. "Quasi instantaneously" means that the compensation is carried out faster than the temporal response of the human visual system.

The method of extending a DC high intensity discharge lamp according to the present invention may furthermore comprise detecting slower changes in output level and compensating for them. Slower changes include changes which appear so slowly that they are not immediately visible by the human eye, e.g. degraded lamp intensity output due to ageing of the lamp.

In a fourth aspect, the present invention provides a policy of replacing DC lamps in a projector system, based on life time, whereby life time of lamps is determined by a method according to embodiments of the present invention.

In a fifth aspect, the present invention provides the use of a lamp control system according to embodiments of the present invention to extend life time of a DC discharge lamp, in particular a DC HID lamp.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

How the present invention may be put into effect will now be described by way of example with reference to the appended drawings, in which:

FIG. 2a illustrates an abrupt light flux change, FIG. 2b illustrates the resulting light output from the system if the slow feedback loop is not active, and FIG. 2c illustrates that the control system with the fast and the slow loop can keep the light output at a desired level despite abrupt light flux changes appearing at the lamp.

Figure 1:
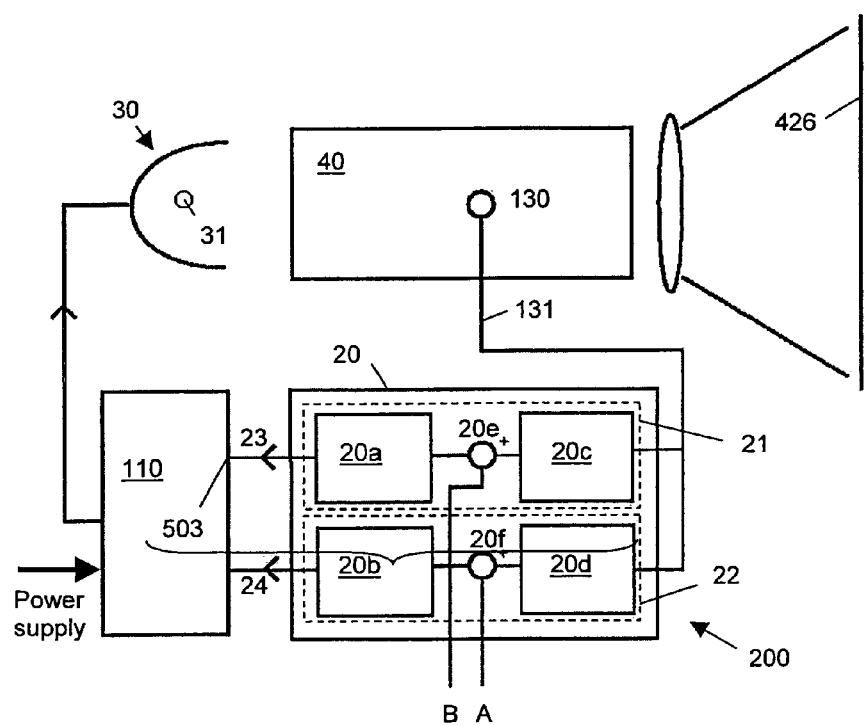
FIG. 1 diagrammatically illustrates a first embodiment or the present invention, having a fast and an optional slow feedback loop for controlling light output of a DC HID lamp.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

With "light" in the present invention is meant electromagnetic radiation with a wavelength between 200 and 2000 nm, i.e. visible light, IR radiation, near IR and UV radiation. The light sensor used needs to be sensible in the wavelength region of the light source used. If the sensor is used in visible light applications, it may only react on changes in the visible light. If the sensor is used in IR applications, it may only react on IR fluctuations.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Without being limited by theory, the end of lamp life of a HID arc lamp in a light valve projection display is defined by any of at least two phenomena, in particular by the one which appears first:

1. Decrease, below a certain level, e.g. below 50% of the initial level, over the lamp life, of the light flux coupled into the illumination system of a projection display.

2. Flicker of the light intensity on the screen with an amplitude above a certain level, e.g. above 1% of the light intensity. Flicker is the perception that corresponds to a modulation of luminance. The flicker is caused by a displacement of the arc relative to the optics of the illumination system, which may be fast arc displacements, with a frequency>1 Hz, or so-called arc jumps which have a frequency<1 Hz. Visibility of flicker depends on the amplitude, frequency of intensity change, luminance level and the spatial frequency of the image (spatio-temporal response). The temporal frequency at which the patterns appear steady to a viewer is about 60 to 70 Hz.

These two phenomena are caused mainly by:
blackening of the glass (deposition of evaporated electrode material on the quartz glass),
increased arc-length (electrodes wear away during use, and this is all the more the case for electrodes having an asymmetrical architecture) which causes a lower coupling towards the optical system causing lower light-output of the system, and
instability of arc-position jumping around of arc is causing flicker of the image).

The embodiments of the present invention can increase lamp life by reducing the above phenomena or correcting for these, by keeping the light flux coupled into the illumination system constant or at least more constant over the lamp life and/or by reducing or eliminating the visibility of the arc displacements.

Embodiments of this invention can be applied to HID DC lamps, such as xenon lamps or high pressure mercury lamps.

FIG. 1 illustrates a first embodiment of the present invention. This first embodiment of the present invention illustrates a lamp control system 200 of a projection device, for obtaining life extension of a DC discharge lamp, preferably a DC HID lamp. A DC lamp unit comprises at least one lamp-reflector assembly 30 comprising a high intensity discharge (HID) DC lamp 31 driven by a DC lamp power supply controller 110. The light flux of lamp-reflector assembly 30 is coupled into an illumination and modulation system 40. A light sensor 130 is positioned on a specific location in the illumination and modulation system 40 to provide an electrical signal 131 proportional to the total light flux of the lamp-reflector assembly 30. The location of the sensor 130 should be such that the detected light intensity is proportional to the average light intensity over the area of the display screen, and so that it is independent of the image content. This means that the light sensor 130 has to be positioned before the light modulator. The sensor may not be sensible to spectral variations in the light. Neither may it be sensible to wavelengths falling outside the wavelengths used for the illumination application, e.g. in case of a projector for visual light, the sensor may not react to IR fluctuations.

The electrical signal 131 from the light sensor 130 feeds a controller 20 having at least first compensation means 21 for edge compensation in the light flux of the lamp-reflector assembly 30 an in particular of the DC HID lamp 31. The first compensation means 21 generates a fast control signal 23 to quasi instantaneously or instantaneously compensate for edges in the light detected by the light sensor 130, which fast control signal 23 is fed to the lamp power supply controller 110. With "quasi instantaneously" is meant that the compensation is carried out faster than the temporal response of the human visual system.

The controller 20 preferably comprises a high pass filter 20c and a drive circuit 20a to drive the lamp power supply 110. The lamp power supply 110 delivers a controlled amount of power to the lamp 31, depending on a first reference A generated by a processing means (not illustrated in FIG. 1) and on the electrical signal 131.

The controller 20 compensates for edges in the light flux of the lamp-reflector assembly 30, and therefore corrects for the flicker appearing in DC HID lamps. Unexpectedly, this compensation seems to also positively influence the gradually changing light fall-off over life time. The combined result is that life time is extended much more than what could be expected.

The controller 20 may furthermore comprise second compensation means 22 for generating a slow control signal 24 to compensate for slower changes in output level detected by the light sensor 130. The slower changes include changes which appear so slowly that they are not immediately visible by the human eye, e.g. degraded lamp intensity output due to ageing of the lamp.

When the lamp-reflector assembly 30 and/or the illumination and modulation system 40 introduces a random disturbance, this will be detected by the light sensor 130, which generates a corresponding electrical signal 131. Through the high pass filter of the controller 20 this signal is returned to a processing means such as e.g. a differential amplifier, comparing this signal with a reference signal. The output of the controller 20 controls the lamp power supply 110 in order to achieve a constant light-flux on light sensor 130. The controlled light output in function of time, which is obtained with a system according to the first embodiment of the present invention, is illustrated in FIG. 2b.

As can be appreciated from FIG. 1, according to an embodiment of the present invention, in fact two compensation loops may be provided in the lamp control system 200: a fast compensation loop and a slow compensation loop.

The fast compensation AC coupled loop is provided in the lamp control system 200, comprising the lamp-reflector assembly 30 with the HID lamp 31 driven by the lamp power supply controller 110, the illumination and modulation system 40, the light sensor 130 and the first compensation means 21. The first compensation means 21 comprises a high pass filter 20c and a drive circuit 20a to drive the lamp power supply controller 110. The lamp power supply controller 110 delivers a controlled amount of power to the lamp 31, depending on a first reference A generated by a processing means (not illustrated in FIG. 1) and on the electrical signal 131.

When the lamp-reflector assembly 30 and/or the illumination and modulation system 40 introduces a random disturbance, this will be detected by the light sensor 130, which generates a corresponding electrical signal 131. Through the high pass filter 20c this signal is returned to a processing means such as e.g. a differential amplifier 20e, comparing this signal with a second reference signal B. The output of this processing means, e.g. differential amplifier 20e, controls the circuit 20a to drive the lamp power supply controller 110 in order to achieve a constant light-flux on light sensor 130.

Functions of the fast-compensation loop include compensating quasi instantaneously or instantaneously for edges of transient changes caused by arc displacements. As this is an AC coupled loop the correction will disappear after a while. During this time the slow control loop has to take over and keep the light-flux constant. An example is shown graphically in FIGS. 2a-2c. Light output of the lamp-reflector assembly 30 is shown versus time.

In parallel with the fast compensation loop, a slow compensation loop may be present, which is a DC coupled loop, comprising the lamp-reflector assembly 30 with the HID lamp 31 driven by the lamp power supply controller 110, the illumination and modulation system 40, the light sensor 130, and the second compensation means 22. The second compensation means 22 comprises a low pass filter 20d and a drive circuit 20b to drive the lamp power supply controller 110. The lamp power supply controller 110 delivers a controlled amount of power to the lamp 31, depending on a first reference A generated by a processing means (not illustrated in FIG. 1) and on the electrical signal 131.

In use, the lamp-reflector assembly 30 generates an amount of light-flux coupled into an optical system comprising the illumination and modulation system 40. This light-flux is measured with light sensor 130, which generates a corresponding electrical signal 131. Through the low pass filter 20d this electrical signal 131 is returned to a processing means such as e.g. a differential amplifier 20f, comparing this signal with the first reference signal A in an analog circuit e.g. comprising an active electronic element such as a comparative amplifier, or in a digital circuit e.g. comprising a processing element. The output of this processing means, e.g. amplifier 20f, controls the circuit 20b to drive the lamp power supply controller 110 in order to achieve a constant light-flux on the light sensor 130. The timing interval, i.e. the sampling frequency and therefore the correction frequency, by which the first reference A is changed in order to control the average light-output of the system, is defined by the processing means.

Functions of the slow-compensation loop include the following:

Compensating for slow variations over the lifetime of a lamp.

Compensating for tolerances in between different lamps when using a system with a plurality of lamps, e.g. for multi-channel systems having a plurality of lamps for projecting images on different areas of a display screen, or for multi-lamp systems having a plurality of lamps for projecting images on a same area of a display screen.

Compensating for a residual error after interaction of the fast-compensation loop (see below).

Figure 2A:
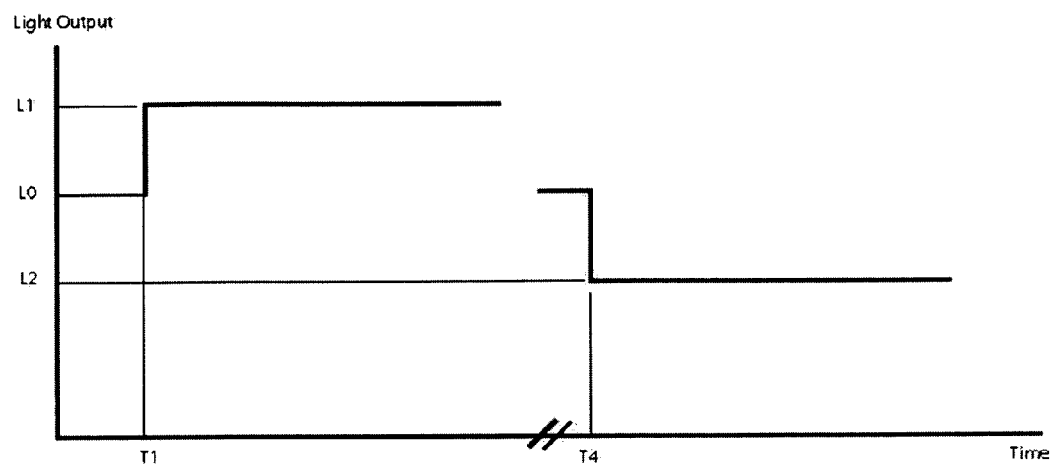
FIGS. 2a to 2c show graphs of light output over time.
Figure 2B:
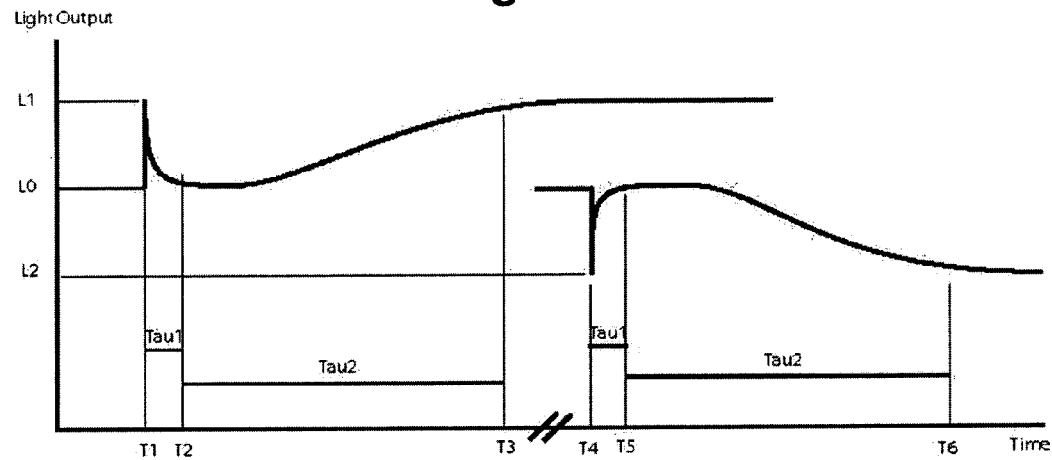

During operation the light coupled into the illumination and modulation system 40 of the projection display arrangement is expected to be at level L0 (see FIG. 2a). At time T1 there is an abrupt displacement of the arc in the light bulb of the HID lamp 31. This arc displacement will result in an abrupt change of the light coupled into the illumination and modulation system 40 to a value L1. Without the feedback control system according to the present invention this would result to a noticeable change of the illumination on the display screen 426 if the displacement of the arc is sufficiently large in amplitude. Illumination changes of ~1% in amplitude are noticeable by the human visual system if the frequency is <50 to 60 Hz.

With the electro-optical feedback control system according to the first embodiment of the present invention the light sensor 130 detects this abrupt light flux change and produces an electrical signal 131 proportional to the quasi instantaneously changing light intensity on the light sensor 130 (the light intensity on the light sensor 130 is proportional to the total light flux coupled into the illumination and modulation system 40). The switching time of a light sensor is typical ~20 ns. This electrical signal 131 is fed back to the lamp power supply controller 110 through the high pass filter 20c of the first compensation means 21, and will result in a fast change (with time constant $\tau 1$) of the power applied to the HID lamp 31 and thus an elimination of the light flux change in the illumination and modulation system 40 if the loop gain of the feedback system is sufficiently large and stable. This light flux change, shown by the peak in FIG. 2c will not be noticeable if the control loop comprising the first compensation means 21 reacts faster (e.g. <10 ms range) than the temporal response of the human visual systems. Because of the slow feedback loop comprising the second compensation means 22, the lamp power will be restored to its original value L0 with a time constant $\tau 2 >> \tau 1$. This will result in a very slow light flux variation which is not noticeable by the human visual system.

Figure 2C:
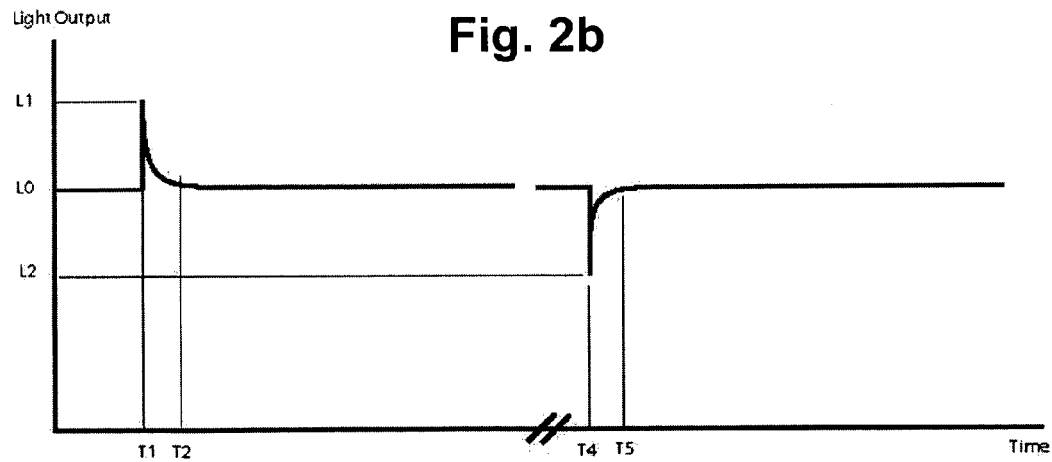

FIG. 2c shows that the control system 200 comprising the first compensation means 21 and the second compensation means 22 can keep the light output at L0, between times T2 and T3.

FIG. 2b shows another curve gradually increasing during the time between T2 and T3. This is the light output if the second compensation means 22, i.e. the proportional slow feedback loop, is not active to maintain the correct level L0 over longer periods, i.e. when only the instantaneous changes are filtered out by the first compensation means 21, i.e. the fast feedback loop. In that case, the light output will evolve towards L1 as can be seen from FIG. 2b.

Figure 4:
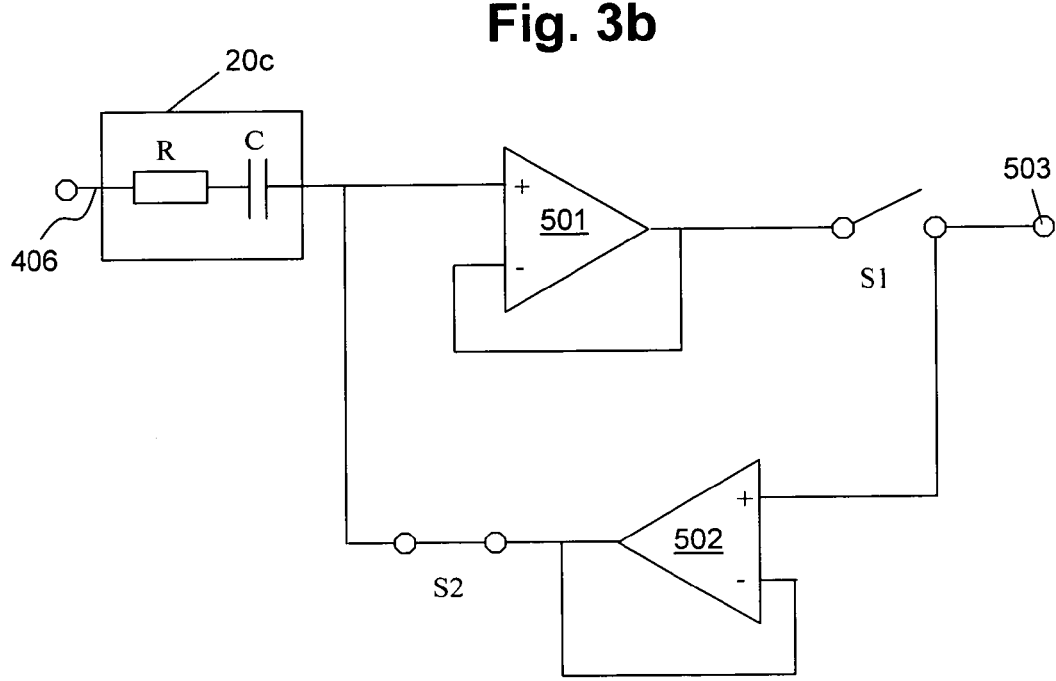
FIG. 4 shows a filter circuit for the embodiment of FIG. 1 or other embodiments.

At T4, another similar event is shown, but the arc displacement results in a drop of the light output. The control system 200 with the first and the second compensation means 21, 22, i.e. the fast and the slow loop, reacts to maintain the light output at L0, as illustrated in FIG. 4c. The control system with only the fast loop would react to maintain the light output at L1, as illustrated in FIG. 4b.

As an option, the first compensation means 21 and/or the second compensation means 22, i.e. the fast and/or the slow control loop, can be equipped with an AGC (Automatic Gain Control), in order to extend the dynamic range of these control loops. This AGC of course needs to have a slow reaction speed, in order not to react on the fast disturbances.

Figure 3A:
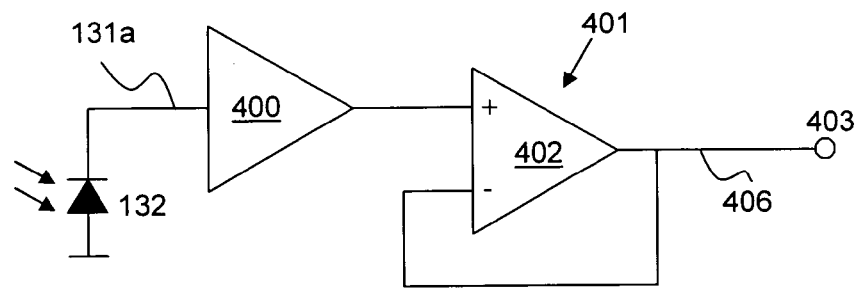
FIG. 3a shows a sensor circuit for the fast feedback loop of FIG. 1
Figure 3B:
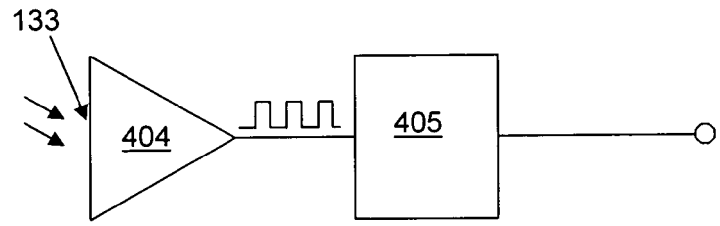
FIG. 3b shows a sensor circuit for the slow feedback loop for the embodiment of FIG. 1 or other embodiments.

The light sensor 130 as used in the first embodiment of the present invention may be part of a sensor circuit, e.g. as illustrated in FIGS. 3a and 3b. An exemplary sensor circuit for use in the embodiment of FIG. 1 will now be described. This circuit can be implemented using two different sensors for slow and fast correction. Alternatively (not illustrated in FIGS. 3a and 3b), a single light sensor 130 could be used for both the fast and the slow feedback loop. FIGS. 3a and 3b illustrate a sensor circuit with separate sensors 132, 133 for the fast and the slow feedback loop.

As illustrated in FIG. 3a, a first light sensing element 132, such as e.g. a PIN photodiode, may be used as the brightness sensor for the fast feedback loop comprising the first compensation means 21. The electrical signal 131a from the first light sensing element 132 is amplified by an amplifying element 400, typically by an opamp. A buffer circuit 401, e.g. using another opamp 402 having its output fed back to its negative input terminal, is coupled between the amplifying element 400 and the node 403 to the first compensation means 21. The buffered signal is then fed to the controller 20, more particularly to the first compensation means 21 thereof. Buffering can be used to lower the impedance of the signal for sending it to the first compensation means 21 described below.

A second light sensing element 133, the slow sensor, may e.g. be implemented as a light to frequency converter 404, as illustrated in FIG. 3b, or as any other suitable light to signal converter. The light to frequency converter 404 may e.g. be component TSL235R which can be obtained from Texas Advanced Optoelectronic solutions or component TSL230 which can be obtained from Texas Instruments. Its output is a signal which is frequency dependent on the received amount of light. This frequency is processed in a processing means 405 such as e.g. a microcontroller or a programmable digital logic device such as a Programmable Array Logic (PAL), a Programmable Logic Array, a Programmable Gate Array, especially a Field Programmable Gate Array (FPGA), to be then transferred, for example digitally transferred, to the controller 20, more particularly to the second compensation means 22 thereof.

The first light sensing element 132 and the second light sensing element 133 may physically be one and the same element, in which case the light sensing element needs to be a fast sensor, such as e.g. a PIN photodiode.

The first compensation means 21, part of the controller 20, provides edge compensation. An exemplary block-schematic illustration is given in FIG. 4.

The signal 406 that is coming from the light sensor 131, in particular from the fast light sensor 132, is sent to the high pass filter 20c built around a resistor R and a capacitor C.

The high pass filter 20c is coupled to a first buffer 501, the output of which is coupled to a first switch S1. Switch S1 is open in non-operational mode of the first compensation means, while a second switch S2 is closed in this situation.

A second buffer 502 brings a DC voltage at the capacitor C of the high pass filter 20c at the same level as the input 503 of the lamp power supply controller 110. This is needed to prevent that any current would flow between the first compensation means 21 and the lamp power supply controller 110 when the circuit is switched on. Not preventing this current flow could result in an abnormal output power to the lamp 31, which is not allowed. By providing this buffering circuit with the second buffer 502 the switching can occur smoothly with no visible effect on the light output. The analog switches S1 and S2 can be controlled by control means such as e.g. transistors, and can be driven e.g. by a digital output from a controller, which can be a local processor or any other processor available in the lamp control system 200 (not illustrated in FIG. 1).

When the compensation circuit, and thus the controller 20, is active, the second switch S2 is opened and the first switch S1 is closed. The high pass filter 20c is now between the light sensor 130 and the lamp power supply controller 110. Fast variations in light output are compensated for, while slow variations are not coming through, as they are being blocked by the high pass filter 20c. They are compensated for in the slow compensation circuit 22, which may be a digital compensation circuit.

In the above-described first embodiment of the present invention, a lamp control system 200 for a single DC lamp 31 is illustrated. According to the present invention, a plurality of DC lamps 31 and lamp-reflector assemblies 30 may be provided for illuminating a same area, e.g. on a projection screen 426. This is what is called a multi-lamp system. A single light sensor 130 associated with the plurality of lamp-reflector assemblies 30 may be provided for sensing the light emitted by the plurality of DC lamps 31. Alternatively, a plurality of light sensors 130 may be provided, for example a light sensor 130 being associated with each DC lamp 31, or even a plurality of light sensors being associated with each DC lamp 31. Each DC lamp may be provided with a separate power supply controller 110. 3. The controller 20 may be arranged so that the first compensation means 21 provides the edge compensation for each DC lamp 31 separately, while the second compensation means 22 provides the level control part common to more than one of the DC lamps 31.

Figure 5:
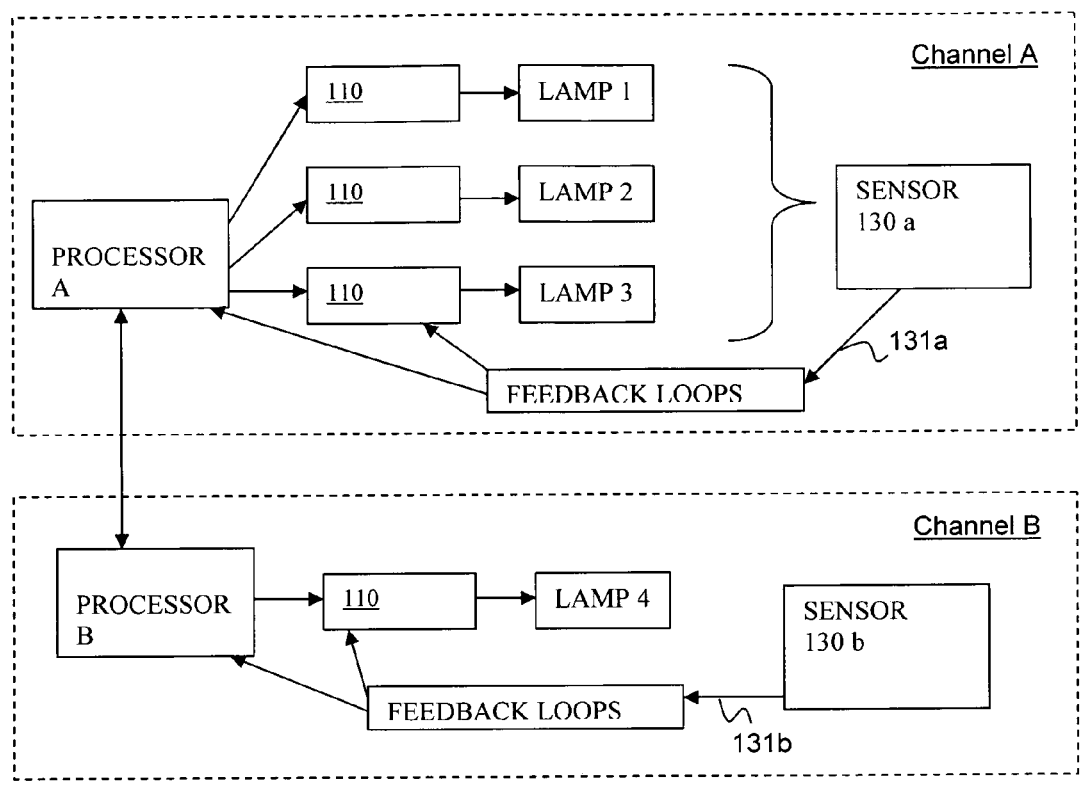
FIG. 5 shows a multi-channel embodiment.

According to a second embodiment of the present invention, a multi-channel system is provided. An illustrative example of such multi-channel system is illustrated in FIG. 5. In a multi-channel system, a plurality of DC lamps are provided for illuminating different areas.

In a multi-channel projector system it is desirable to have all the projection devices in this system at the same output luminance level. This means the light-output of each projection device is equal if the illuminated area and the screen characteristics of all projection devices are identical. With a suitable communication system between the individual projection devices, the information of the light output levels can be exchanged between the projection device and adjusted to an equal luminance level.

FIG. 5 schematically shows an example of a multi-channel system with two channels A and B, however, this can be extended to any m×n configuration of illumination devices, e.g. projection devices such as rear and/or front projectors. As shown, each channel can have one or multiple light sources. In the embodiment illustrated in FIG. 5, the first channel A comprises three light sources, lamp 1, lamp 2 and lamp 3, and the second channel B comprises a single light source, lamp 4, each light source having a DC or AC power supply 110.

One or more light sensors 130a, 130b is provided for each channel A, B, for example a fast and a slow light sensor 130a, 130b for each channel A, B. Fast and slow compensation feedback loops are provided for each channel A, B. An electrical signal 131a, 131b from the one or more light sensors 130a, 130b is provided to the respective feedback loops of the channels A, B. The fast feedback loop may get the sensor signal 131a, 131b from the sensor 130a, 130b respectively, and apply it to the respective power supplies 110 of the light sources lamp 1, lamp 2, lamp 3, lamp 4 in order to filter out fast changes in the light output of the respective light sources lamp 1, lamp 2, lamp 3, lamp 4. The slow feedback loop may get the sensor signal 131*a*, 131*b* from the sensor 130*a*, 130*b* respectively, and apply it to the respective power supplies 110 of the light sources lamp 1, lamp 2, lamp 3, lamp 4 in order to filter out slow changes in the light output of the respective light sources lamp 1, lamp 2, lamp 3, lamp 4. The slow feedback loop may include a processing means such as processor A, processor B for each channel A, B, which processing means have the intelligence to adjust the light-flux for its own channel A, B in accordance with the light flux of the other channels. The processing means may for instance be a microcomputer, a programmable digital logic device such as a Programmable Array Logic (PAL), a Programmable Logic Array, a Programmable Gate Array, especially a Field Programmable Gate Array (FPGA). A communications link between each processing means processor A, processor B may be provided, such as an $I^2C$ link for example. An alternative (not illustrated in the drawings) is to have a single master control unit that will act as a master to control the different needed light-outputs of the individual light emitting devices such as e.g. projection devices.

By linking the channels A, B between each other, as illustrated in FIG. 5, the following difficulties in multi-channel systems can be avoided or reduced:

Replacing one lamp in the system. If the system is not linked this would mean the new lamp/projection device will have a much higher light-output compared to the others in the system. Due to the communication and adjustment process, the light-output of the projection device with the replaced lamp will be reduced to the same light-output as the others in the system.

Compensating for the differential aging of the lamps with the communication and adjustment method: in time one lamp will age faster than another. If the projection devices are linked all projector outputs are reducing with age at the same rate.

The fast compensation loop is compensating of course for arc-instability for each of the projectors individually.

In case an individual projection device has more than one lamp the fast and the slow loop may be fed back to all supplies separately. Alternatively, the fast loop may be fed back to all supplies separately, and the slow loop may be common to more than one of the lamps.

The lamps used with embodiments of the present invention can include the following examples:

Osram XBO 2200W/HP (Xenon—DC-lamp)
Osram XBP 1200W/HP (Xenon—DC-lamp)
Ushio PXL-20BA (Xenon—DC-lamp)
Ushio NSH300W (Mercury—DC-lamp).

Figure 6A:
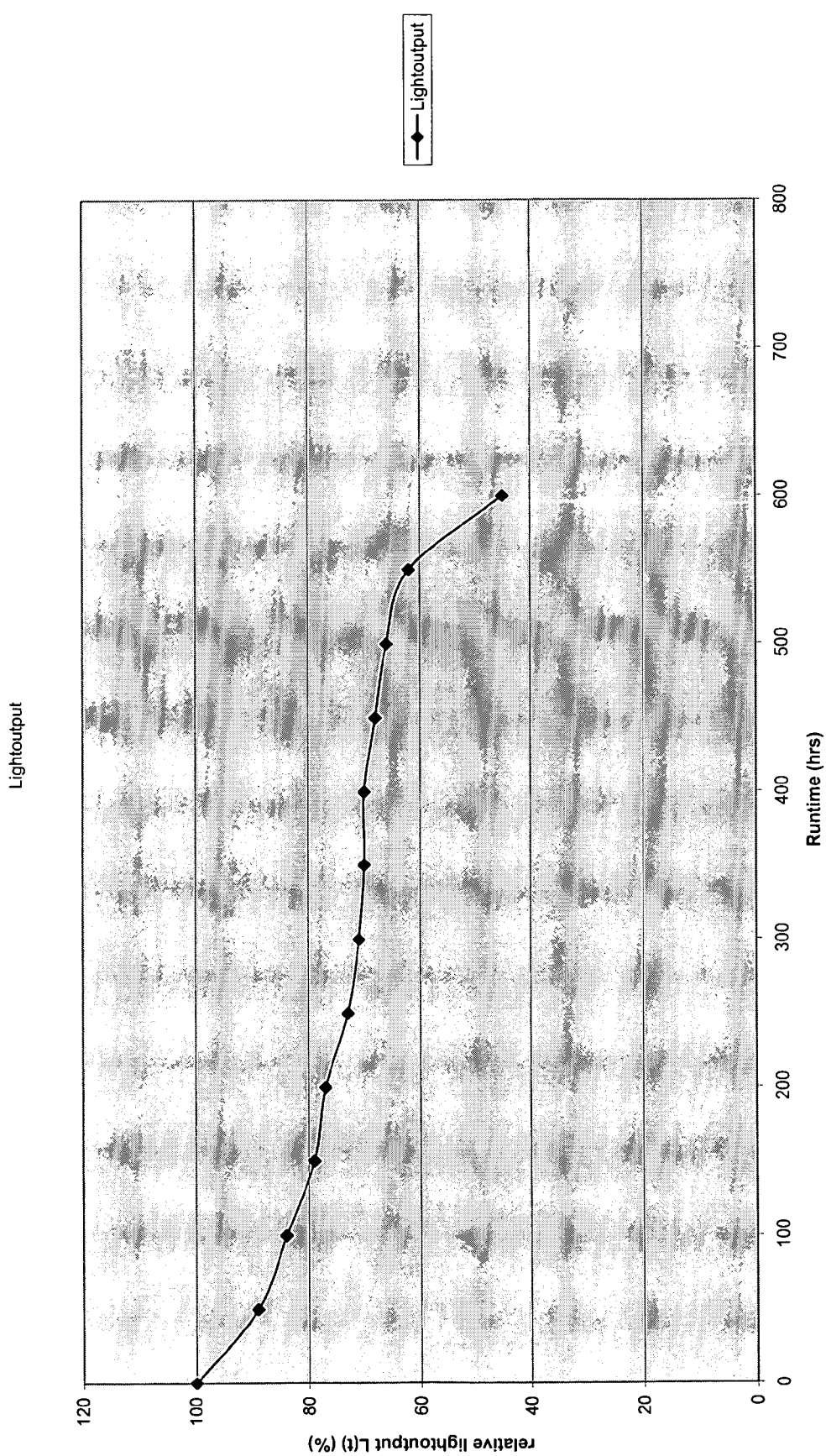
FIG. 6a and FIG. 6b respectively illustrate light output and flicker percentage in function of on time of a lamp, in case of normal operation, i.e. without the compensation circuit according to embodiments of the present invention.
Figure 6B:
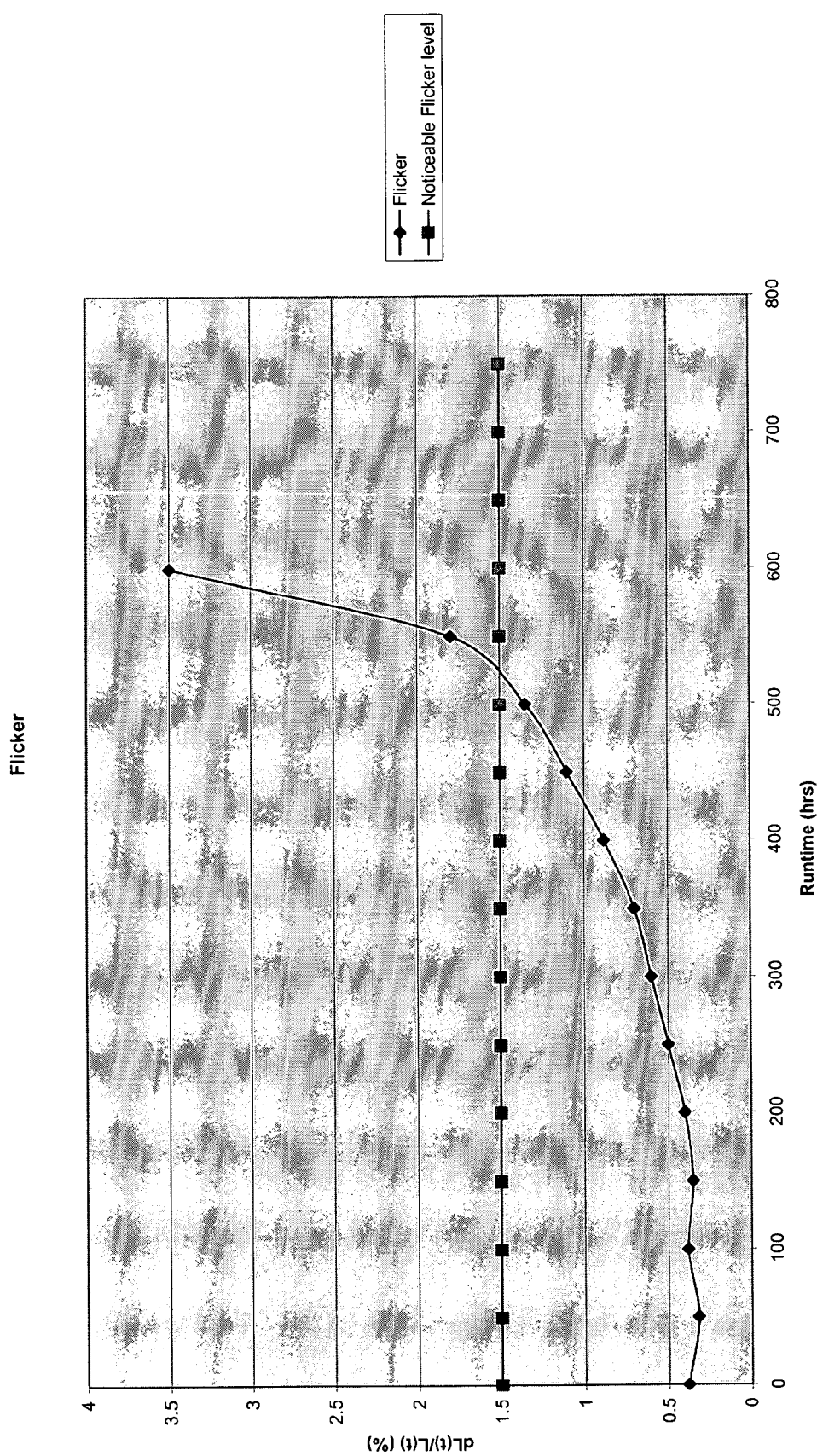
Figure 6C:
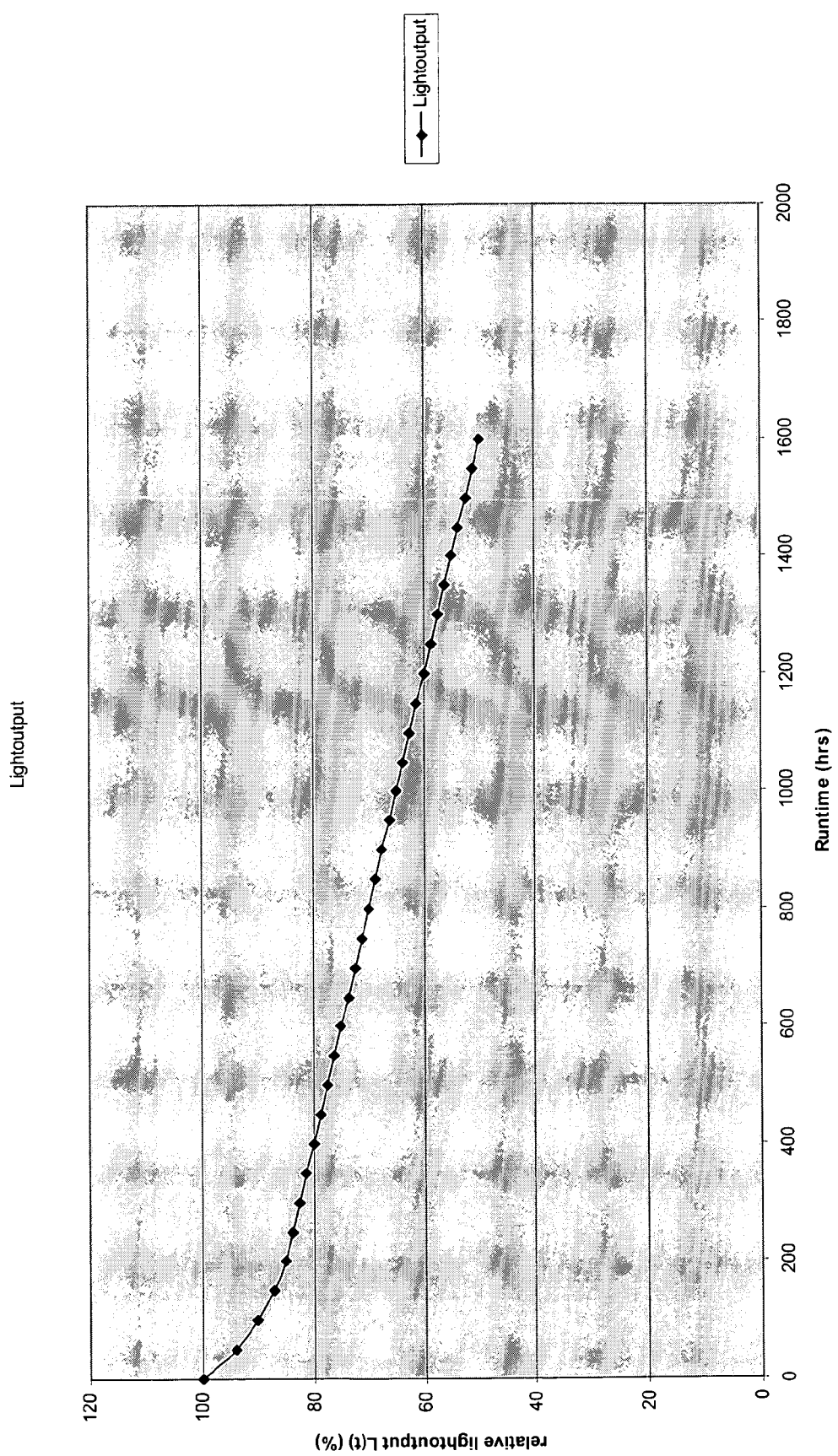
FIG. 6c and FIG. 6d respectively illustrate light output and flicker percentage in function of on time of a lamp when using a compensation circuit according to an embodiment of the present invention.
Figure 6D:
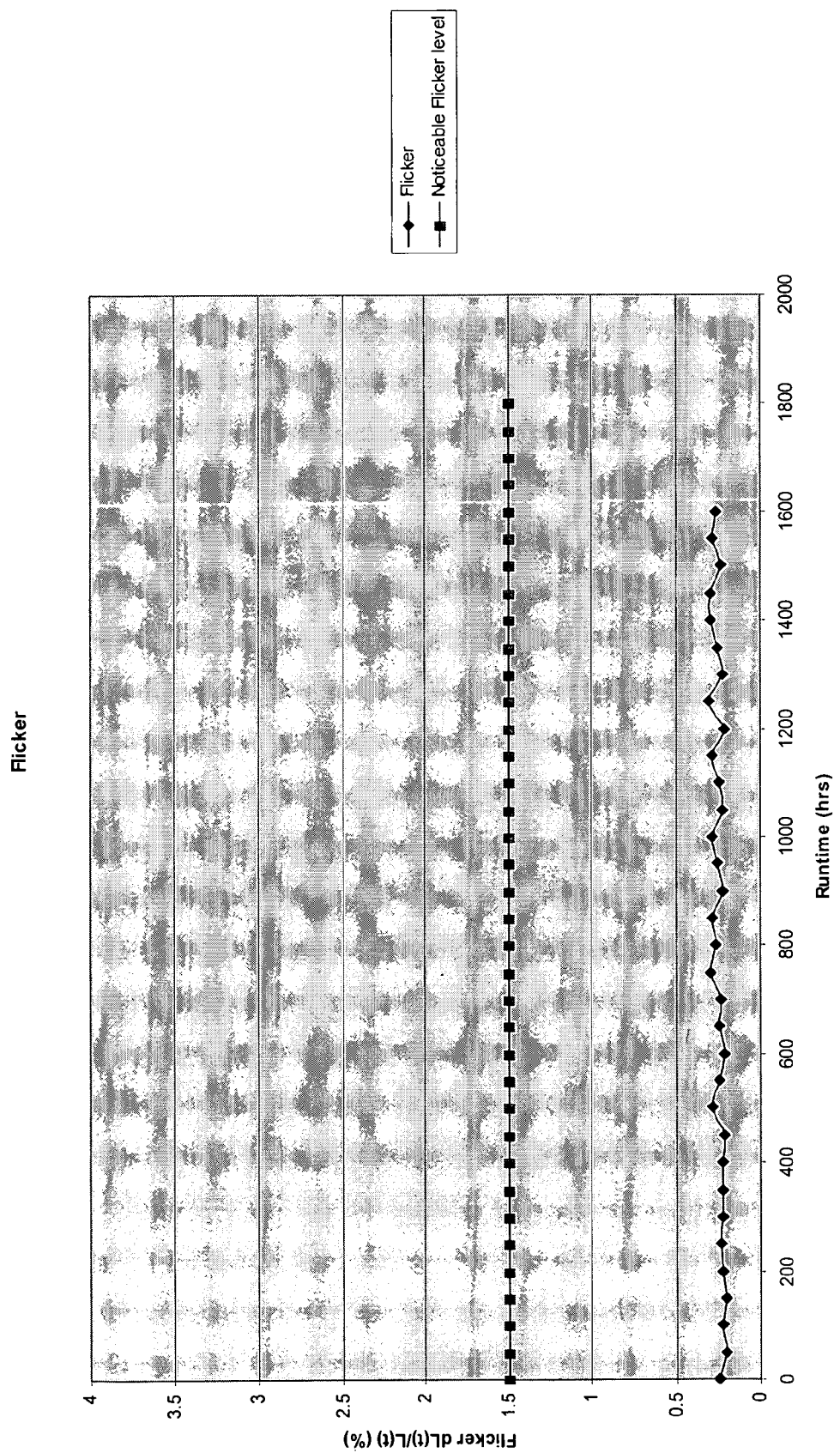

It has been found surprisingly that the lifetime of the HID DC light sources is increased by a factor of at least about 2 to 2.5 with respect to rated lamp life. This is illustrated in FIGS. 6*a* to 6*d*. FIG. 6*a* illustrates light output of a DC lamp in function of time without the compensation circuit of the present invention being present. It can be seen that after about 580 hours the light output drops below 60%. Flicker becomes unacceptable when its level becomes >1.5%. This value is reached at about 500 hours of on time, as illustrated in FIG. 6*b*. FIG. 6*c* illustrates the light output of a same DC lamp in function of time, with the fast and the slow compensation circuits of embodiments of the present invention being present. It can be seen that the light output drops below 60% only after about 1300 hours. Flicker becomes unacceptable because its level reaches more than 1.5% only after 1600 hours of operation time (FIG. 6*d*).

In view of the above, a DC lamp replacement policy can be set up, according to which DC lamps are replaced at their end of life time, the end of life time being determined by a method according to embodiments of the present invention. As the methods according to embodiments of the present invention extend the lifetime of the DC lamps, DC lamps controlled in accordance with embodiments of the present invention will have to be replaced less often than lamps driven in conventional ways.

It is to be understood that although preferred embodiments, and specific constructions and configurations have been discussed herein for devices according to the present invention, various changes or modifications in form and detail may be made without departing from the scope and spirit of this invention. For example, although described for projector applications, clearly the lamp control for extending lamp life can be applied to any other type of lighting using such lamps. As described above, a lamp control for a DC high intensity discharge lamp has a light sensor for sensing an output of the lamp, a power supply for the lamp, and a controller for controlling the power supply, having a high pass filter for compensating for a leading edge of a detected change in lamp power output caused by each arc displacement. Lamp life can be extended since damage to the lamp electrodes by the arc displacements is reduced. The system can have multiple lamps for the same illumination area, or multiple channels for illuminating different areas, coupled to provide uniform illumination. The controller can compare a sensed level to a reference, to output a level control signal, then add a correction signal from the high pass filter to the level control signal. Other variations can be conceived within the scope of the claims.

The invention claimed is:

1. A lamp control system for life time extension of at least one DC discharge lamp, comprising at least one sensor for sensing an output of the at least one DC discharge lamp, at least one DC power supply for the at least one DC discharge lamp, and a controller for controlling the at least one DC power supply according to an output of the at least one sensor, the controller including means for controlling the at least one DC power supply output by detecting and instantaneously compensating for a leading edge of a detected change in lamp power output caused by each arc displacement.

2. The system of claim 1, the controller furthermore comprising a level control part to maintain a constant light output level of the at least one DC discharge lamp.

3. The system of claim 2, the controller comprising a control loop with a high pass filter for the edge compensation and a slower loop with low pass filter for the level control.

4. The system of claim 2, being adapted for controlling multiple DC discharge lamps for a same illumination area, the controller being arranged to provide the edge compensation for each DC discharge lamp separately, the level control part being common to more than one of the DC discharge lamps.

5. The system of claim 1, being adapted for use in a multiple channel system having multiple DC discharge lamps for illuminating different areas, wherein the lamp control system is arranged so that each channel has a sensor and a level control loop, the channels being coupled such that the light output level of each channel corresponds to the output levels of others of the channels.

6. The system of claim 1, the controller comprising a processing means for comparing a sensed level to a reference, and outputting a level control signal to the at least one DC power supply.

7. The system of claim 1, wherein the sensor is a light sensor.

8. A projector system with improved life time, comprising the lamp control system of claim 1.

9. A method of extending life time of a DC discharge lamp, comprising detecting and instantaneously compensating for a leading edge of a lamp power output change caused by an arc displacement.

10. A method according to claim 9, furthermore comprising detecting slower changes in output level and compensating for them.

11. Method of replacing DC discharge lamps in a projector system based on life time, whereby life time of the DC discharge lamps is determined by the method of claim 9.

* * * * *